Nov. 17, 1964  T. J. COLLINS  3,157,436
CARGO VEHICLE WITH CLAM SHELL HOPPER
Filed May 1, 1963

INVENTOR.
THOMAS J. COLLINS
BY
ATTORNEY

United States Patent Office 3,157,436
Patented Nov. 17, 1964

3,157,436
CARGO VEHICLE WITH CLAM SHELL HOPPER
Thomas J. Collins, 1517 Rexford Place, Las Vegas, Nev.
Filed May 1, 1963, Ser. No. 277,373
8 Claims. (Cl. 298—25)

This invention relates to cargo hauling vehicles and more particularly to a semi-trailer type motor-propelled road vehicle featuring a clam shell hopper assembly together with fluid-powered means for opening and closing the clam shell in a simple, highly efficacious manner.

The cargo hauling vehicle herein disclosed is specially designed for transporting loose material in bulk and is characterized by the ease with which the hopper may be loaded at the receiving station and emptied at the discharge station.

As herein shown by way of example, each half of the clam shell hopper is arranged to pivot about a common axis extending transversely of a sturdy, heavy-duty trailer chassis frame. This chassis may be of either the full or semi-trailer type designed to be hauled over the highway by a tractor. In the interest of simplicity a semi-trailer serves admirably, its forward end being supported on a fifth wheel carried on the rear portion of the tractor assembly.

A particular feature of the invention is the simple, highly effective fluid operated means provided for opening and closing the hopper halves in a manner conveniently and readily controlled by the operator from a remote station, such as the driver's cab of the tractor. Preferably, the fluid motor comprises a pair of identical cylinders each fitted with a pair of opposed pistons. The cylinders are mounted on a carriage shiftable to and fro vertically along a guide rail rigidly fixed to the inner side walls of the trailer frame, the ends of the oppositely extending piston rods being connected at their outer ends to respective ones of the clam shells. Owing to the described traveling carriage support for the operating cylinders these are constricted to move in a vertical path between the two clam shells to prevent axial displacement of the cylinders. This expedient taken in combination with the equalizing connection between the two clam shells assures equal and positive opening of each clam shell. During a major portion of the closing movement gravity is effective to aid closing movement of the shells. However, loading of the shells with cargo could result in their opening movement and to safeguard against this the cylinder includes provision for charging pressurized fluid into their outer ends thereby to hold the clam shells positively closed against one another.

Accordingly, a primary object of the present invention is the provision of an unusually simple, rugged, high efficiency cargo truck suitable for hauling loose material and for dumping it under controlled conditions at the discharge station.

Another object of the invention is the provision of a motor-propelled trailer unit employing a trailer chassis mounting a pair of clam shell buckets transversely thereof including power means for opening and closing the shells.

Another object is the provision of a cargo truck provided with a clam shell hopper having simple, unique and effective means for synchronizing opening and closing thereof.

Another object of the invention is the provision of a heavy-duty cargo carrier for over-the-highway use featuring a hopper built in two pivoting halves arranged to be simultaneously and positively opened in unison by fluid motor means connected directly to the hopper halves and mounted on a carriage constrained to move vertically of the trailer frame.

These and other more specific objects will appear upon reading the following specification and claims and upon considering in connection therewith the attached drawing to which they relate.

Referring now to the drawing in which a preferred embodiment of the invention is illustrated:

Figure 1:
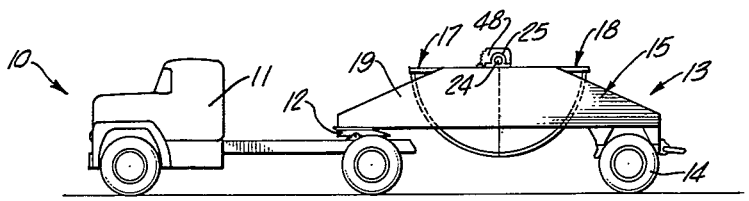
FIGURE 1 is a schematic view of an illustrative embodiment of the invention as viewed from one side.
Figure 2:
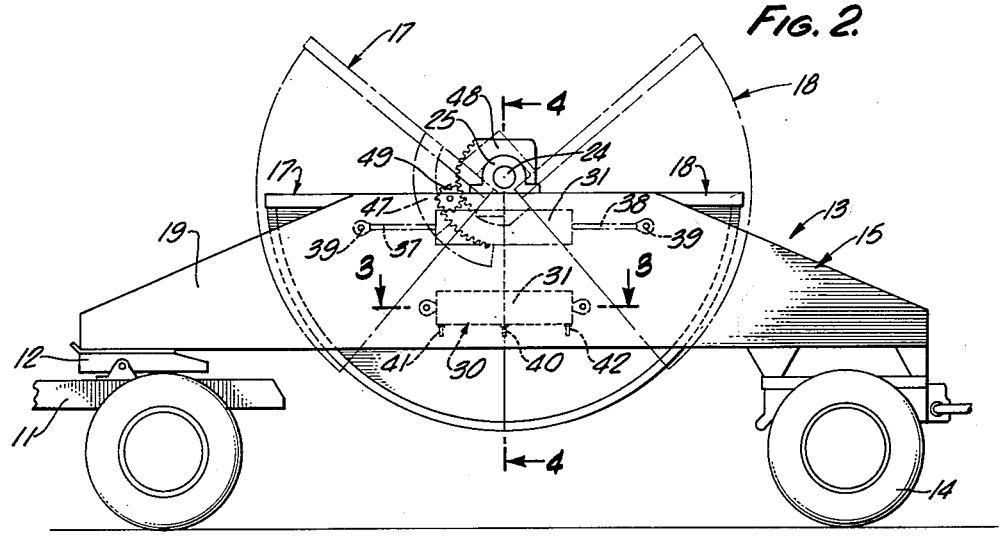
FIGURE 2 is an enlarged side view of the semi-trailer unit and indicating by broken lines the open position of the hopper components.

Referring more particularly to FIGURE 1, there is shown a typical embodiment of the invention designated generally 10 and including a motor-propelled tractor unit 11. Coupled to the rear of this tractor as by the conventional fifth wheel indicated at 12 is a semi-trailer 13. This trailer has a rear supporting carriage 14 and a generally rectangular main frame 15. Pivotally supported transversely of the midportion of this frame and between its two sides are a pair of substantially identical clam shell hopper halves 17, 18, the details of which are best illustrated in FIGURES 2 to 4.

Main frame 15 of the trailer may be fabricated from structural steel or aluminum and, as here shown, includes a pair of channel-shaped side frames 19 the inturned flanges 20 of which extend along their upper and lower edges to provide the requisite rigidity and strength for carrying cargo charges weighing several tons in the pivoting hopper structure.

The two halves 17, 18 of the clam shell hopper assembly are fabricated from suitably reinforced sheet metal or plate stock and preferably are devoid of ribs and struts along their interior surfaces, such reinforcing preferably being confined to the exterior of the shells. These hopper halves are each provided with heavy-duty ears 22, 23 (FIGURE 4) rigidly secured to a respective one of the clam shells and having aligned openings journaled on a combined shaft and spacer member 24 extending transversely between the main frame members 19. The opposite ends of this shaft are welded or otherwise fixedly secured to supporting brackets 25 appropriately secured to the upper edge of these side frame members. As herein shown shaft 24 is shown welded to brackets 25 but it will be understood the outer ends may be provided with threaded nuts or other suitable keeper means. It will also be understood that ears 22, 23 journaled on these trunnions may be provided with suitable bearing sleeves and lubricating fittings. It will be recognized that shaft 24 serves an important function in holding the frame members 19 rigidly spaced apart under all load conditions and safeguards against sagging and binding action at the various bearings for the shells and their operating cylinders.

Figure 3:
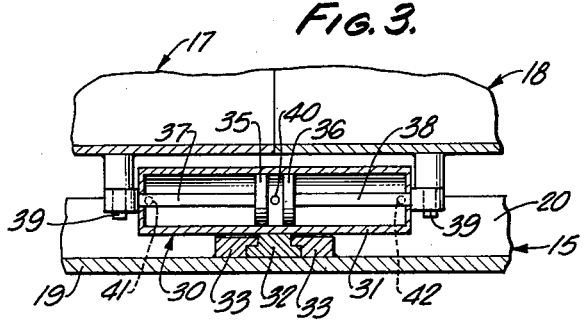
FIGURE 3 is a fragmentary sectional view on an enlarged scale taken along line 3—3 on FIGURE 2.
Figure 4:
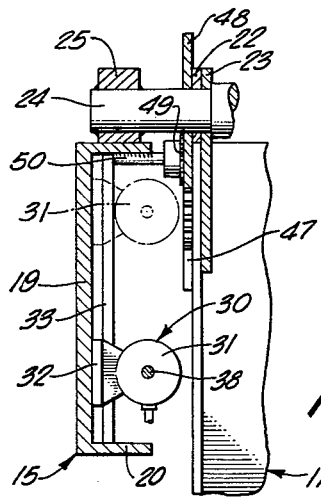
FIGURE 4 is a fragmentary sectional view on an enlarged scale taken along line 4—4 on FIGURE 2.

The power means provided for opening and closing the clam shells is best shown in FIGURES 3 and 4 and is designated generally 30. This means comprises a pair of identical cylinders 31 arranged horizontally and generally parallel to one another across the opposite ends of the two clam shells. Each cylinder is fixed to a carriage 32 of T-shape in horizontal section, the head of the T being slidable vertically along and between guide rail means indicated at 33, 33. These guide rails are bolted or otherwise secured vertically along the interior side walls of the trailer main frame members 19, 19. It will be understood that carriage 32 and guide rails 33, 33 cooperate to provide a shiftable reaction connection permitting free movement of the associated motor 30 vertically while preventing tilting, twisting or bodily axial movement of the motor.

Slidably supported within each cylinder are a pair of pistons 35, 36 having piston rods 37, 38 extending in opposite directions through the end walls of the cylinders. While not shown, it will be understood that the end walls of the cylinders are preferably provided with suitable packing glands to prevent loss of fluid. The outer ends of the piston rods are journaled to pins 39 projecting outwardly from the sides of each of the hopper halves.

The midportion of each cylinder is provided with a fluid supply connection 40 and the opposite ends of each cylinder are likewise provided with fluid connections 41, 42 connectable by flexible hoses or other conduits to suitable control valves and a source of pressurized fluid such as air or hydraulic fluid. The control valves and the pump for maintaining this fluid under pressure are not shown since they are well known to workers in this art.

To further assure synchronous opening and closing movement of clam shells 17 and 18 irrespective of unequal loading or other factors, the two shells are provided with toothed sectors 47, 48, respectively and a meshing pinion 49 mounted on a shaft 50 suitably supported on side members 19. A toothed sector 47 is secured to either side wall of shell 17 with its teeth concentric with the axis of shaft 24. Similarly toothed sectors 48 are welded to the sides of shell 18 with its notched rim projecting past shaft 24 into proximity to the teeth on sector 47. Pinion 49 rotates on the stationary stub shaft 50 with its teeth meshing with the teeth of both sectors. It will be understood that these teeth mesh quite loosely in order to permit them to mesh with the teeth of the pinion. This is not objectionable in any way owing to the short arcs through which the shells pivot and the short periods of use of these synchronizing components.

In the operation of the described heavy-duty cargo hauler, it will be understood that the parts are normally in the position shown in FIGURES 1 and 2. Under these conditions pressurized fluid is normally connected through supply fittings 41 and 42 to the opposite ends of cylinders 31 thereby to maintain remote ends of the pistons 35, 36 under pressure with the result that this fluid is effective to hold the clam shells 17, 18 firmly and rigidly closed against one another. In these circumstances the upper rim edges of clam shells 17, 18 lie substantially in a common horizontal plane close to the upper edge of the trailer frame.

To empty loose material filling the described hopper, the operator sitting in the cab of tractor 11 need but adjust the fluid control valves (not shown) to admit pressurized fluid to the center inlet 40 of each cylinder while taking care to open the valves leading to fittings 41, 42 to release this fluid back to the supply tank. The fluid entering through ports 40 then acts equally against each of the pistons forcing these away from one another to pivot clam shells 17, 18 in opposite directions about trunnions 24. In so doing it will be apparent from a consideration of FIGURE 2 that pivot pins 39 of the two hopper halves must rise. This requirement is accommodated by carriages 32 and the guide rails mounting the two fluid motors. These is no possibility that one shell will open while the other remains substantially motionless because the same pressure acts against both the pistons and the cylinder is prevented by the guide rails from shifting lengthwise of the trailer. Additionally, pinions 49 meshing with synchronizing sectors 47, 48 attached to the opposite sides of the respective clam shells provide positive assurance against either shell pivoting except concurrently with one another but in opposite directions.

Closing movement of the shells is accomplished by proper adjustment of the control valves thereby releasing the pressurized fluid for discharge through supply fittings 40. Gravity is then effective to close the clam shells toward one another at a rate controlled by the rate of fluid discharge through fittings 40. At the end of, or during, the closing operation fluid can be admitted to the opposite ends of the cylinders to expedite closing by forcing the pistons toward one another. Desirably the outer ends of the cylinders are thereafter maintained under pressure to avoid any possibility of the clam shells opening to release the contents of the hoppers onto the pavement until the trailer is ready to discharge its contents.

While the particular cargo vehicle with clam shell hopper herein shown and disclosed in detail is fully capable of attaining the objects and providing the advantages hereinbefore stated, it is to be understood that it is merely illustrative of the presently preferred embodiment of the invention and that no limitations are intended to the details of construction or design herein shown other than as defined in the appended claims.

I claim:

1. A cargo vehicle for hauling loose material over a highway comprising a wheeled chassis having a main frame including a pair of spaced-apart main frame members extending lengthwise along either side of the vehicle and generally parallel to one another, a pair of clam shell buckets pivotally supported between the midlengths of said main frame members on shaft means effective to hold said main frame members in spaced-apart parallel relation and arranged to close against one another by gravity action, and a pair of pressurized fluid motor means located one across the opposite ends of said clam shell buckets and connected thereto for opening said buckets away from one another to discharge the contents thereof, and reaction connection means between said pair of pressurized fluid motor means and the adjacent one of said frame members.

2. A heavy-duty cargo vehicle for hauling loose material over a highway, said vehicle having a wheeled chassis and an elongated rigid rectangular frame, a pair of clam shells pivotally supported on a common shaft extending crosswise of the midportion of said frame and effective to hold the side members of said frame spaced apart, pressure-operated piston and cylinder means arranged across the opposite ends of said clam shells for opening said clam shells by substantially equal increments, said means including a cylinder at either end of said clam shells supported on said frame for bodily movement only in a vertical path, a pair of pistons in each cylinder movable to and fro within the opposite ends of the cylinder and each having a piston rod connected to the adjacent one of said clam shells, and means for supplying pressurized fluid to said cylinders at a point between said pistons.

3. A cargo vehicle as defined in claim 2 characterized in that said means for mounting said cylinders for vertical movement on said frame is mounted on the interior sides of said frame and in that the vertical movement of said cylinders is confined to a path no longer than the vertical dimension of the adjacent areas of said frame whereby said cylinders are protected and concealed from view thereby.

4. A cargo vehicle as defined in claim 2 characterized in that said means for mounting said cylinders on said frame comprises rigid guide rail means and a cooperating carriage means having interlocking engagement therewith and arranged for controlled movement lengthwise of said guide rail, one of said last named means being rigidly secured to said cylinder and the other being rigidly secured to said frame.

5. A cargo vehicle as defined in claim 2 characterized in that the midportion of said cylinder is secured to said chassis and in that said cylinder includes means for supplying pressurized fluid to its remote ends to move said clam shells to closed position and to hold them closed until such time as it is desired to empty the same.

6. A cargo vehicle as defined in claim 2 characterized in that said clam shells each have a bottom extending through an arc of approximately 90 degrees whereby in their closed positions their upper edges lie in substantially a common plane opposite the upper edges of the vehicle frame.

7. A cargo vehicle as defined in claim 2 characterized in the provision of a pair of toothed sectors fixed to a respective one of said clam shells concentrically of their common pivot axis, and a pinion meshing with said toothed sectors and rotatably supported on shaft means supported in a fixed position on said frame, said pinion and sectors cooperating to require said clam shells to open and close in unison irrespective of unequal loading and other factors.

8. A semi-trailer road vehicle for hauling loose material in bulk, said vehicle comprising a motor-propelled tractor having a fifth wheel assembly mounted near the rear end thereof, a single axle semi-trailer having a rectangular main frame provided with means at its forward end for coupling and supporting the same on said fifth wheel, a pair of clam shells movably supported transversely of the midportion of said main frame for opening and closing movement lengthwise of said trailer and between the sides of said frame and having their upper edges lying in a generally horizontal position opposite the upper edges of the frame when closed together, fluid-operated cylinder means located along the inner sides of said main frame and supported thereon for bodily movement in a vertical path, a pair of pistons in each cylinder having rods extending in opposite directions each movably connected to a different one of said claim shells, means for supplying pressurized fluid to said cylinder means at their opposite ends and between said pistons to operate said clam shells to and from the closed positions thereof, and meshing toothed means interconnecting said clam shells and including pinion means supported on said main frame cooperating to require said clam shells to pivot in unison with one another.

References Cited by the Examiner
UNITED STATES PATENTS

| 706,221 | 8/02 | Chaquette | 37—184 |
| 939,130 | 11/09 | Hazen | 298—25 |
| 2,663,231 | 12/53 | Wood | 298—30 X |
| 2,991,730 | 7/61 | Arbel | 298—35 |

MILTON BUCHLER, *Primary Examiner.*

RALPH D. BLAKESLEE, *Examiner.*